W. P. LOUDON.
STORAGE BATTERY CONSTRUCTION.
APPLICATION FILED APR. 20, 1918.

1,323,479.

Patented Dec. 2, 1919.

WITNESS:

INVENTOR.
Warren P. Loudon.
BY
ATTORNEY.

# UNITED STATES PATENT OFFICE.

WARREN P. LOUDON, OF NIAGARA FALLS, NEW YORK, ASSIGNOR TO U. S. LIGHT & HEAT CORPORATION, OF NIAGARA FALLS, NEW YORK, A CORPORATION OF NEW YORK.

STORAGE-BATTERY CONSTRUCTION.

1,323,479.   Specification of Letters Patent.   Patented Dec. 2, 1919.

Application filed April 20, 1918. Serial No. 229,845.

*To all whom it may concern:*

Be it known that I, WARREN P. LOUDON, a citizen of the United States, residing at Niagara Falls, in the county of Niagara and State of New York, have invented new and useful Improvements in Storage-Battery Construction, of which the following is a specification.

The present invention relates to storage battery construction.

A great deal of difficulty has been experienced in storage battery practice due to the fact that electrolyte will creep out of the cells along the cell posts. This creepage is probably due to capillary attraction and is expedited by the vibration to which the cell posts are often subjected, particularly when the storage batteries are being used on motor cars or in any other situations where considerable vibration is encountered. Various expedients have been used for preventing the escape of the electrolyte from the cells along the cell posts.

An object of the present invention is to provide a construction whereby creepage of the electrolyte along the cell posts will be prevented and which will be simple and inexpensive.

A further object is to provide a construction which may be readily assembled and disassembled.

Further objects will be apparent as the description proceeds.

Referring to the drawings—

Figure 2:
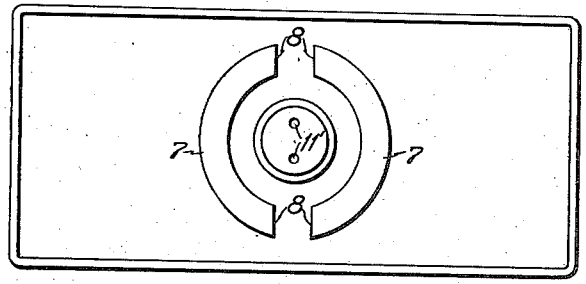
Fig. 2 represents a plan view.
Figure 1:
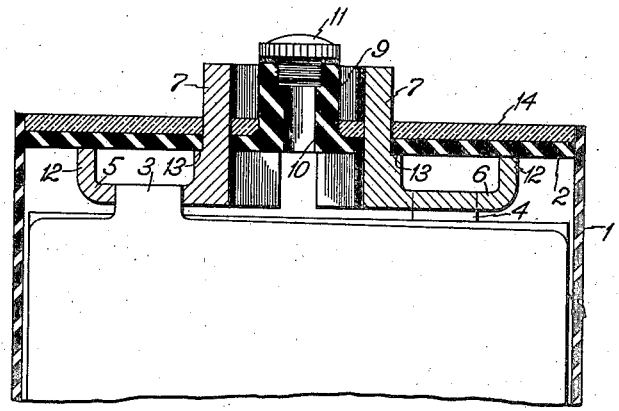
Figure 1 represents in sectional elevation one embodiment of the present invention.

The walls of a storage battery cell are indicated by the numeral 1. The cell is provided with a cover indicated by the numeral 2. Located within the walls 1 are active elements of the cell which are provided with lugs 3 and 4. The lugs 3 are connected to the battery plates of one polarity while the lugs 4 are connected to battery plates of the opposite polarity. Each of the lugs 3 is united, as by burning, to a strap 5. The lugs 4 are similarly united to a strap 6. Each of the straps 5 and 6 is provided with a cell post for the purpose of providing an electrical conductor from the interior of the cell to the exterior thereof. The cell posts are indicated by the numerals 7, 7. Said cell posts extend through suitable apertures in the cover 2 and may be similar to one another in construction. According to the present invention, the cross sectional outline of the posts 7, 7, will differ from the construction ordinarily provided. According to the present invention, the length of the boundaries of this cross-sectional outline should be relatively large compared to the area thereof, whereby a relatively large gripping area will be provided. The cell posts 7, 7, have been indicated as being arcuate in cross-sectional outline. Preferably, the arcs representing the cross-sectional outlines of the posts 7, 7, should have squared ends as indicated at 8, 8.

The cell posts 7, 7, should be symmetrically placed adjacent to the center of the cover 2. Said cell posts 7, 7, will provide between them a space which may be utilized to provide an aperture for filling and inspection. As illustrated in Fig. 2, the cover is provided with an upstanding annular collar 9, said collar providing on its interior the aperture 10. The aperture 10 may be closed by the cap 11 which will prevent the entrance of foreign material into the cell. The cap 11 should be provided with small holes 11', to permit the escape of gases.

The straps 5 and 6 may each be provided with an upstanding side portion 12 which serves as a means for supporting the cover 2. The cell posts 7, 7, may also be provided with shoulders 13, 13, which will also serve to support said cover 2.

After the active elements, with the cell posts 7, 7, attached, have been assembled within the cell walls 1, the cover 2 will be mounted upon the cell posts, resting upon the shoulders 13, 13, and upon the upstanding members 12, 12. Sealing compound 14 will then be applied to the upper side of the cover 2 and will tightly seal the cell posts 7, 7, to said cover 2 as well as sealing the cover 2 to the walls 1.

Due to the fact that a relatively large gripping surface is provided between the cell posts 7, 7, and sealing compound 14, compared with the cross-sectional area of the cell posts, there will be considerably less likelihood for the cell posts to pull loose from the sealing compound than if said cell posts were of the ordinary round construction. It has been observed that the greatest stresses tending to pull the cell posts loose from the sealing compound, are the twisting stresses, due to vibration of the groups within the cell walls and to the twisting stresses due to vibration of the connecting straps which are connected to the cell posts. The large gripping area provided by the cell posts 7, 7, will effectually resist these twisting stresses. Furthermore, the squared ends 8, 8, will still further resist the twisting stresses. It will be evident also that inasmuch as the cover 2 is supported by the straps 5, 6, at a plurality of points, by the shoulders 13 and the upstanding portions 12, 12, there will be very little relative rocking movement between the cell posts 7, 7, and the compound 13 which is carried by the cover 2. With the construction illustrated, therefore, the simple expedient of applying sealing compound to the top of the cover will be sufficient for preventing the escape of electrolyte under ordinary conditions of service.

One embodiment of the present invention has been described in detail. Many modifications will occur to those skilled in the art. It is intended in this patent to cover all such modifications that come within the scope of the present invention as defined by the appended claims.

What I claim as new and desire to secure by Letters Patent of the United States is:—

1. In a battery cell, in combination, a cell cover, a cell post extending therethrough, sealing material sealing said post to said cover, said post having a cross sectional outline where it extends through said cover relatively long compared to its cross-sectional area.

2. In a battery cell, in combination, a cell cover, a pair of cell posts extending therethrough, each of a cross-sectional outline having a concave side, said posts being symmetrically placed adjacent to the center of said cover, and sealing material sealing said posts to said cover.

3. In a battery cell, in combination, a cell cover, a pair of cell posts extending therethrough, each of a cross-sectional outline having a concave side, said posts being symmetrically placed adjacent to the center of said cover, and sealing material sealing said posts to said cover, said posts having their concave sides facing one another, said cover being provided with a filling aperture between said posts.

4. In a battery cell, in combination, a pair of plate straps each having an upturned side portion to provide a cover support and having cell posts provided with abutments which abutments constitute cover supports.

5. In a battery cell, in combination, a cell cover, a pair of plate straps each having an upturned side portion and a cell post of a cross-sectional outline relatively long compared to its cross-sectional area, said posts extending through said cover, and sealing material sealing said posts to said cover.

6. In a battery cell, in combination, a cell cover, a pair of plate straps each having an upturned side portion and a cell post of a cross-sectional outline relatively long compared to its cross-sectional area, said posts extending through said cover, and sealing material sealing said posts to said cover, said posts being provided with means for supporting said cover.

7. In a battery cell, in combination, a cell cover, a cell post extending therethrough, sealing material sealing said post to said cover, said post having a cross-sectional outline which is in the form of a segment of an annulus with squared ends.

In witness whereof, I have hereunto subscribed my name.

WARREN P. LOUDON.